April 24, 1951 J. A. RANKIN 2,550,378

WAVE SIGNAL AMPLIFIER, INCLUDING INPUT ELECTRODE CAPACITANCE NEUTRALIZING MEANS

Filed Feb. 14, 1946

INVENTOR.
John A. Rankin
BY Mueller & Mason
Attorneys

Patented Apr. 24, 1951 2,550,378

UNITED STATES PATENT OFFICE 2,550,378

WAVE SIGNAL AMPLIFIER, INCLUDING INPUT ELECTRODE CAPACITANCE NEUTRALIZING MEANS

John A. Rankin, Park Ridge, Ill., assignor to Belmont Radio Corporation, Chicago, Ill., a corporation of Illinois Application February 14, 1946, Serial No. 647,601

9 Claims. (Cl. 179—171)

Figure 1:
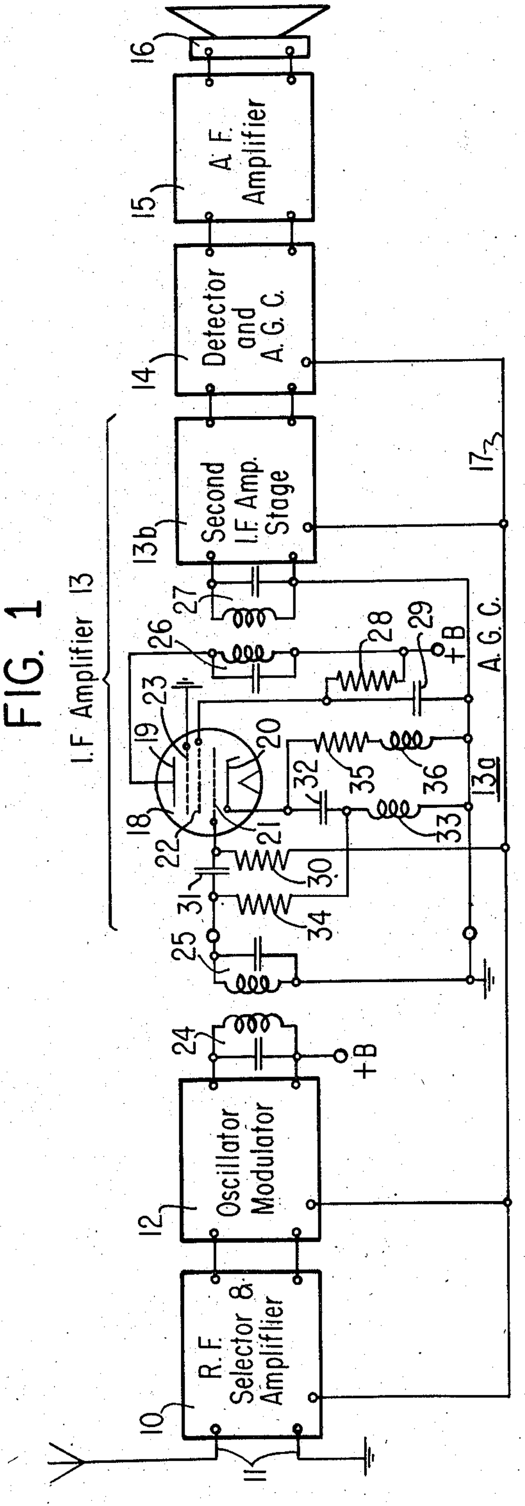

The present invention relates to wave signaling systems and more particularly to an improved wave signal amplifier adapted for use at the variable gain intermediate frequency stages of a conventional wave signal receiver of the superheterodyne type.

One of the problems involved in the design of a satisfactory frequency selective variable gain amplifier is that of obtaining acceptable neutralization of variations in the input electrode capacitance of the tubes employed without at the same time effecting an appreciable and unwanted loss in gain. To be more specific, in a conventional pentode type amplifier stage of the frequency selective type, variations in the input electrode capacitance of the tube have the effect of mistuning the frequency selective input circuit of the stage and hence are to be avoided. In general, the tube input electrode capacitance is made up of two components, i. e. the cold or static input electrode capacitance and the apparent or electron capacitance resulting from electron flow within the tube. The latter component varies as a function of the mutual conductance of the tube and hence varies with changes in the bias impressed between the input electrodes of the tube. Being a variable component, it cannot be accounted for in the design of the frequency selective input circuit for the tube and must be neutralized if mistuning of this circuit is to be avoided. To overcome this difficulty and thus render an amplifier of the type described adaptable for variable gain operation under the influence of automatic gain control facilities, for example, it has been conventional practice to employ a cathode resistor common to the input and output circuits of the tube to neutralize variations in the input electrode capacitance of the tube. Use of a resistor for this purpose, however, produces a loss in signal translation gain through the tube since, for a given tube anode potential, it has the effect of reducing the change in space current flow through the tube which results from a given signal induced change in the potential of the tube control grid. Such degeneration becomes increasingly undesirable as the ratio between the tube mutual conductance and the resistance value of the resistor is decreased. Contrawise, greater neutralization of tube input electrode capacitance variations is acheved as this ratio is decreased. For this reason, the usual practice has been that of compromising between gain requirements and permissible mistuning of the amplifier tube input circuits in designing an amplifier of the character described.

It is an object of the present invention, therefore, to provide in a wave signaling system, an improved wave signal amplifier in which the above-mentioned problems are obviated in an entirely simple manner.

It is another and more specific object of the invention to provide effective neutralization of variations in the input electrode capacitance of an amplifier tube without effecting an appreciable loss in the signal translation gain between the input and output circuits coupled to the tube.

It is a further object of the invention to provide improved neutralizing facilities for the purpose indicated, at least one component of which may also be employed to obtain the desired degree of damping of the frequency selective tube input circuit.

According to still another object of the invention, the desired neutralization of tube input electrode capacitance variations is obtained without complicating the problem of independently obtaining the desired bias between the tube input electrodes.

Figure 2:
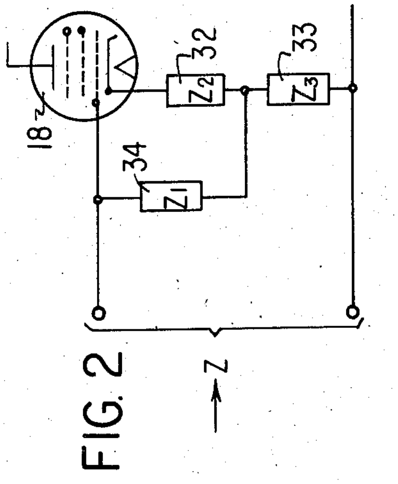

The invention, both as to its organization and method of operation, together with further objects and advantages thereof, will best be understood by reference to the following specification taken in connection with the accompanying drawing, in which:

Fig. 1 is a circuit diagram, partially schematic, of a complete radio broadcast receiver of the amplitude-modulation type incorporating a wave signal amplifier characterized by the features of the present invention; and Fig. 2 illustrates in simplified form and for explanatory purposes, certain of the components of the detailed amplifier stage incorporated in the receiver shown in Fig. 1.

Referring now to the drawing and more particularly to Fig. 1 thereof, there is illustrated a wave signal amplifier embodying the present invention and incorporated in an amplitude-modulation receiver. Briefly, the receiver comprises a tunable radio frequency selector and amplifier unit 10 having its input terminals connected to an antenna-ground system 11. Connected in cascade with the unit 10, in the order named, are a tunable oscillator modulator 12, an intermediate frequency selector and amplifier 13, a detector and automatic gain control unit 14, an audio frequency amplifier 15 and a signal reproducer or loud speaker 16. Considered as a whole, the described receiver is entirely conventional in construction and operation so that a detailed description thereof is deemed unnecessary. In brief, however, amplitude-modulated carrier signals intercepted by the antenna system 11 are applied to the selector and amplifier unit 10 wherein they are selected and amplified and delivered to the oscillator modulator 12. In the unit 12, the signals are converted into an intermediate frequency signal which is delivered to the amplifier 13 for further selection and amplification, following which they are applied to the detector and automatic gain control unit 14 for detection of the signal or modulation components. At the output side of the detector and automatic gain control unit 14, the signal components are delivered to the audio frequency amplifier 15 for amplification, following which they are impressed upon the loud speaker 16 for reproduction. In order to maintain substantially constant the level of signal reproduction by the loud speaker 16 regardless of variations in the intensity of the signal modulated carrier intercepted by the antenna-ground circuit 11, an automatic gain control circuit 17 is provided in the receiver which is supplied in an entirely conventional manner with a variable bias potential from the automatic gain control section of the unit 14. Also in accordance with conventional practice, this bias potential is applied to the input electrodes of the tubes in the units 10, 12 and 13 and is automatically varied to vary the gain through the amplifier stages of these units inversely in accordance with the intensity of the intercepted signal modulated carrier.

Referring now more particularly to the intermediate frequency amplifier 13 with which the present invention is specifically concerned, it is pointed out that this amplifier is comprised of two stages 13a and 13b of identical circuit arrangement. Briefly, the first stage 13a of the amplifier 13 is comprised of a vacuum tube 18 of the well-known pentode type such, for example, as the commercial type 6AG7, having input electrodes, i. e. a control grid 21 and cathode 22, coupled through a condenser 31 to a frequency selective input circuit 25 which in turn is inductively coupled to the frequency selective output circuit 24 of the oscillator modulator unit 12. The inductively related parallel resonant circuits 25 and 24 are respectively center tuned to the intermediate frequency which the intermediate frequency section of the receiver is designed to pass. The tube 18 is also provided with output electrodes, i. e. an anode 19 and the cathode 20, coupled to an output circuit which comprises a parallel resonant circuit 26 inductively coupled to a parallel resonant circuit 27 forming the input circuit of the second intermediate frequency amplifier stage 13B. The tube 18 is also provided with a suppressor grid 23 and a screen grid 22 which is by-passed to ground through a condenser 29 and is connected to the available +B potential source through a voltage dropping resistor 28. Anode potentials are supplied to the anode 19 of the tube 18 and the anode of the modulator tube in the modulator unit 12 through the inductive legs of the circuits 26 and 24, respectively. The variable automatic gain control bias and the normal input electrode bias which in combination appear between the circuit conductor 17 and ground is impressed between the input electrodes of the amplifier tube 17 over a path which includes the isolating resistor 30. Since this bias is variable, it will be understood from the above explanation that the input electrode capacitance, i. e. the capacitance between the control grid 21 and the cathode 20, is a variable capacitance shunting the tuned input circuit 25 and that variations in this capacitance will cause mistuning of the circuit 25 unless neutralized.

In accordance with the present invention, means partially common to the described input and output circuits of the tube 18 are provided for substantially neutralizing variations in the input electrode capacitance of this tube without effecting an appreciable loss in the signal translation gain between these circuits. Briefly, this means comprises a series resonant circuit commonly included in the input and output circuits of the tube 18 and made up of the serially related capacitance and inductance elements 32 and 33, and a resistor 34 connected between the control grid 21 and the junction point of the capacitance and inductance elements 32 and 33. The described series resonant circuit is tuned substantially to the same predetermined frequency as the band pass circuits 24, 25, 26 and 27, such that it has negligible impedance at the carrier frequency which the amplifier 13 is designed to pass. Further, in accordance with the invention, a bias path comprising the serially related resistor 35 and radio frequency choke 36 is connected in shunt with the series resonant circuit 32, 33 to maintain the cathode 20 at the proper potential relative to the control grid 21. The choke 36 is designed to have extremely high impedance at the intermediate frequency, such that it in no way interferes with the operation of the described neutralizing facilities in the manner described below.

In considering the manner in which the circuit components 32, 33 and 34 coact with the input and output circuits of the tube 18 to effect neutralization of variations in the input electrode capacitance of this tube without the attendant degenerative effects characteristic of prior art arrangements for this purpose, it is pointed out first that the tube 18 is preferably of a commercial type having high mutual conductance and relatively low input electrode capacitance under normal operating conditions. When a tube of this type is used, the variations in the input electrode capacitance resulting from changes in the mutual conductance of the tube which are brought about through variations in the bias impressed upon the input electrodes 21 and 20 over the automatic gain control circuit 17, are of a relatively low order of magnitude and hence are more susceptible of neutralization by the present improved facilities. In this regard it is reiterated that as the bias potential impressed between the input electrodes of the tube 18 is varied by means of the described automatic gain control facilities to maintain constancy of signal reproduction level at the loud speaker 17, the mutual conductance of the tube 18 is changed to produce the unwanted input elctrode capacitance variations specifically referred to herein.

By reference to Fig. 2 of the drawing, it will readily be understood that when the impedance Z looking into the tube 18 is rendered independent of the mutual conductance of the tube, no mistuning of the frequency selective circuit 25 occurs during operation of the amplifier. Mathematically, it can be shown that $$Z=\frac{1+G_m(Z_2+Z_3)}{J\omega C_0\left[1+\frac{1}{J\omega C_0Z_1}+G_m\left(\frac{K}{C_0}+\frac{Z_2}{J\omega C_0Z_1}\right)\right]} \quad (1)$$

where:

$G_m$=mutual conductance of tube 18
$Z_1$=unknown impedance
$Z_2$=unknown impedance
$Z_3$=unknown impedance
$J=\sqrt{-1}$
$C_0$=cold or static input electrode capacitance of tube 18
K=constant
$\omega=2\pi\times$signal carrier frequency Since variations in the mutual conductance term $G_m$ obviously represent variations in the impedance Z effectively shunting the circuit 25, it is desirable to provide a circuit arrangement which will have the mathematical effect of removing the $G_m$ term from Equation 1. To ascertain the form of circuit which will do this, the last denominator factor of Equation 1 is equated to zero as follows:

$$G_m\left(\frac{K}{C_0}+\frac{Z_2}{J\omega C_0 Z_1}\right)=0 \qquad (2)$$

By making $$\frac{K}{C_0}+\frac{Z_2}{J\omega C_0 Z_1}=0$$

the $G_m$ factor is obviously removed from the denominator of the Equation 1. To do this, the factor $Z_2$ must be a capacitance $C_2$, such that it may be written $$\frac{1}{J\omega C_2}$$

When this conversion is made, the impedance term $Z_1$ must be a resistance $R_1$. Thus Equation 2 reduces to:

$$\frac{K}{C_0}+\frac{1}{J\omega C_0 R_1 J\omega C_2}=0 \qquad (3)$$

Since $J^2=-1$ Equation 3 may be written $$\frac{K}{C_0}-\frac{1}{R_1\omega C_0\omega C_2}=O \qquad (4)$$

In practically all types of radio frequency pentode amplifier tubes the following relationship obtains:

$$C_e=KG_m$$

where:

$C_e$=the input electrode capacitance due to electron flow in the tube, and
K=the tube constant of proportionality Hence:

$$K=\frac{C_e}{G_m}$$

Substituting this value for K in Equation 4 and transposing, the relationship is obtained:

$$\frac{C_e}{C_0 G_m}=\frac{1}{R_1\omega C_0\omega C_2} \qquad (5)$$

of $$\frac{\omega C_e}{\omega C_0 G_m}=\frac{1}{R_1\omega C_0\omega C_2} \qquad (6)$$

Solving for $R_1$ $$R_1=\frac{G_m}{\omega C_e\omega C_2} \qquad (7)$$

Now the values obtained may be substituted in the input impedance Equation 1 as follows:

$$Z=\frac{1+G_m\left(\frac{1}{J\omega C_2}+Z_3\right)}{J\omega C_0\left[1+\frac{1}{J\omega C_0 R_1}+G_m\left(\frac{C_e}{C_0 G_m}-\frac{1}{\omega C_0\omega C_2 R_1}\right)\right]} \qquad (8)$$

But $$R_1=\frac{G_m}{\omega C_e\omega C_2}$$

Therefore:

$$Z=\frac{1+G_m\left(\frac{1}{J\omega C_2}+Z_3\right)}{J\omega C_0\left[1+\frac{1}{J\omega C_0 R_1}+G_m\left(\frac{\omega C_e}{\omega C_0 G_m}-\frac{\omega C_e}{\omega C_0 G_m}\right)\right]} \qquad (9)$$

or $$Z=\frac{1+G_m\left(\frac{1}{J\omega C_2}+Z_3\right)}{J\omega C_0\left[1+\frac{1}{J\omega C_0 R_1}\right]} \qquad (10)$$

In Equation 9 no restrictions are placed on the character of the impedance term $Z_3$. To keep degeneration at a minimum, however, the combined impedance of $Z_2$ and $Z_3$ should be a minimum at the signal carrier frequency. This means that an impedance $Z_3$ should be used which is in series resonance with the capacitative impedance $Z_2$ at the signal carrier frequency and hence that the impedance $Z_3$ should be a pure inductance, the inductive reactance of which is equal to the capacitance reactance of $C_2$ at the signal carrier frequency. Therefore, $J\omega L_3$ may be substituted for $Z_3$ and equated to $Z_2$ as follows:

$$J\omega L_3=-\frac{1}{J\omega C_2} \qquad (11)$$

The final substitution may now be made in the input impedance Equation 10 as follows:

$$Z=\frac{1+G_m\left(\frac{1}{J\omega C_2}+J\omega L_3\right)}{J\omega C_0\left(1+\frac{1}{J\omega C_0 R_1}\right)} \qquad (12)$$

or from Equation 10 the term $$G_m\left(\frac{1}{J\omega C_2}-\frac{1}{J\omega C_2}\right)$$

is obviously zero. Hence, $$Z=\frac{1}{J\omega C_0\left(1+\frac{1}{J\omega C_0 R_1}\right)}=\frac{1}{J\omega C_0+\frac{1}{R_1}} \qquad (13)$$

or $$Z=\frac{R_1}{1+J\omega C_0 R_1}$$

which is the parallel impedance of $R_1$ and $$\frac{1}{J\omega C_0}$$

From the above analysis it will be seen that when capacitive, resistive and inductive circuit elements 32, 34 and 33 are used, the input impedance equation reduces to $$Z=\frac{R_1}{1+J\omega C_0 R_1}$$

in which only constant or invariable terms exist and the factor $G_m$ is eliminated. Thus, variations in the input electrode capacitance of the tube 18 are completely neutralized. In practice, it is of course impossible to obtain an inductance element 33 which is free of resistance losses. This requires that slight modifications be made in the choice of values for $Z_1$ or $R_1$, $Z_2$ or $$\frac{1}{J\omega C_2}$$

and $Z_3$ in order to obtain optimum results.

From the above mathematical analysis, it will be observed that by utilizing circuit components 32, 33 and 34 respectively comprising capacitance inductance and resistor elements, and maintaining the proper relationship therebetween, substantially complete neutralization of input electrode capacitance variations of the tube 18 is obtained. Further, since the series resonant circuit comprising the elements 32 and 33 has negligible impedance at the carrier frequency which the selector circuits 24, 25, 26 and 27 are designed to pass, these circuit components do not introduce any appreciable loss in the signal translation gain realized within the tube 18. Specifically, and so far as the output circuit of the tube 18 is concerned, the series resonant circuit 32, 33 is of negligible impedance, such that the greatest possible space current change in the tube 18 results from a given signal induced change in the potential on the control grid 21. Further, since this series resonant circuit is effectively divorced from the biasing path 35, 36, the circuit constants of the latter path may, within limits, be selected as desired to maintain the normal bias potential relationship between the input electrodes of the tube 18. A further advantage of the circuit resides in the fact that the resistor 34 may, within limits, be adjusted as desired to vary the damping of the tuned frequency selective circuit 25, this resistor being effectively bridged across the circuit 25 in series with the inductance element 33. Thus, the element 34 may be utilized to serve a dual purpose in the described amplifier circuit.

While there has been described what is at present considered to be the preferred embodiment of the invention, it will be understood that various modifications may be made therein which are within the true spirit and scope of the invention as defined in the appended claims.

I claim:

1. A wave signal amplifier comprising an electron discharge tube of the pentode type having an anode, a cathode and a control grid, an input circuit coupled to said cathode and control grid and tuned to a predetermined frequency, an output circuit coupled to said anode and cathode and tuned to said predetermined frequency, a series resonant circuit common to the cathode leg of said input and output circuits and tuned to said predetermined frequency, said series resonant circuit comprising serially related inductance and capacitance elements and having negligible terminal impedance at said predetermined frequency, and means comprising said series resonant circuit and a resistor connected between the junction point of said inductance and capacitance elements and said control grid for substantially neutralizing variations in the input electrode capacitance of said tube without effecting an appreciable loss in the signal translation gain between said input and output circuits.

2. A wave signal amplifier comprising an electron discharge tube of the pentode type having an anode, a cathode and a control grid, an input circuit coupled to said cathode and control grid and tuned to a predetermined frequency, an output circuit coupled to said anode and cathode and tuned to said predetermined frequency, a series resonant circuit common to the cathode leg of said input and output circuits and tuned to said predetermined frequency, said series resonant circuit comprising serially related inductance and capacitance elements and having negligible terminal impedance at said predetermined frequency, means comprising said series resonant circuit and a resistor connected between the junction point of said inductance and capacitance elements and said control grid for substantially neutralizing variations in the input electrode capacitance of said tube without effecting an appreciable loss in the signal translation gain between said input and output circuits, and a cathode biasing path shunting said series resonant circuit and including an element for effectively blocking signal current flow over said path.

3. In a wave signaling system, a wave signal amplifier comprising an electron discharge tube of the pentode type having an anode, a cathode and a control grid, an input circuit coupled to said cathode and control grid and tuned to a predetermined frequency, an output circuit coupled to said anode and cathode and tuned to said predetermined frequency, means for impressing a gain control bias between said cathode and control grid, means for automatically varying said bias inversely in accordance with the signal level in said system, thereby to effect incidental variations in the input electrode capacitance of said tube, a series resonant circuit common to the cathode legs of said input and output circuits and tuned substantially to said predetermined frequency, said series resonant circuit comprising serially related inductance and capacitance elements and having negligible terminal impedance at said predetermined frequency, and means comprising said series resonant circuit and a resistor connected between the junction point of said inductance and capacitance elements and said control grid for substantially neutralizing variations in the input electrode capacitance of said tube without effecting an appreciable loss in the signal translation gain between said input and output circuits.

4. In a wave signaling system, a wave signal amplifier comprising an electron discharge tube of the pentode type having an anode, a cathode and a control grid, an input circuit coupled to said cathode and control grid and tuned to a predetermined frequency, an output circuit coupled to said anode and cathode and tuned to said predetermined frequency, means for impressing a gain control bias between said cathode and control grid, means for automatically varying said bias inversely in accordance with the signal level in said system, thereby to effect incidental variations in the input electrode capacitance of said tube, a series resonant circuit common to the cathode legs of said input and output circuits and tuned substantially to said predetermined frequency, said series resonant circuit comprising serially related inductance and capacitance elements and having negligible terminal impedance at said predetermined frequency, and means comprising said series resonant circuit and a resistor connected between the junction point of said inductance and capacitance elements and said control grid for substantially neutralizing variations in the input electrode capacitance of said tube without effecting an appreciable loss in the signal translation gain between said input and output circuits, and a cathode biasing path shunting said series resonant circuit and including an element for effectively blocking signal current flow over said path.

5. A wave signal amplifier including in combination, an electron discharge tube of the pentode type including an anode, a cathode and a control grid, an input circuit tuned to a predetermined frequency coupled to said control grid, an output circuit tuned substantially to said predetermined frequency coupled to said anode, resonant circuit means having negligible impedance at said predetermined frequency connected to said cathode and common to said input and output circuits, said resonant circuit means including inductance means through which at least a portion of the current from said cathode flows, and resistance means coupled to said inductance means and to said control grid for applying at least a portion of the voltage across said inductance means to said control grid and thereby substantially neutralizing variations in the input electrode capacitance of said tube, said resonant circuit means having substantially no effect on the signal transmission gain between said input and said output circuits at said predetermined frequency.

6. A wave signal amplifier including in combination, an electron discharge tube of the pentode type including an anode, a cathode and a control grid, an input circuit tuned to a predetermined frequency coupled to said control grid, an output circuit tuned substantially to said predetermined frequency coupled to said anode, means coupled to said control grid and said cathode for applying a bias between said control grid and said cathode, resonant circuit means having negligible impedance at said predetermined frequency connected to said cathode and common to said input and output circuits, said resonant circuit means including inductance means through which at least a portion of the current from said cathode flows, and circuit means coupled to said inductance means and to said control grid for applying at least a portion of the voltage across said inductance means to said control grid and thereby substantially neutralizing variations in the input electrode capacitance of said tube, said resonant circuit means having substantially no effect on the signal transmission gain between said input and said output circuits at said predetermined frequency.

7. A signal translating stage including in combination, an electron discharge valve having at least an anode, a cathode and a control grid, said valve having the characteristics that the capacitance between said control grid and said cathode varies with the current from said cathode, an input circuit tuned to a predetermined frequency coupled to said control grid of said valve, an output circuit coupled to said anode of said valve, means coupled to said control grid and said cathode for applying a gain control bias between said electrodes, resonant circuit means having negligible impedance at said predetermined frequency connected to said cathode and common to said input and output circuits, said resonant circuit means including inductance means through which at least a portion of the current from said cathode flows, and resistance means coupled to said inductance means and to said control grid for applying a portion of the voltage across said inductance means to said control grid, said voltage applied to said control grid being effective to neutralize variations in said capacitance between said control grid and said cathode without substantially effecting the signal transmission gain between said input and output circuits.

8. A signal translating stage for amplifying a modulated carrier wave of a predetermined frequency including in combination, an electron discharge valve having at least an anode, a cathode and a control grid, input and output circuits respectively coupled to said control grid and said anode of said valve, means coupled to said control grid and said cathode for applying a gain control bias therebetween for controlling the current flowing through the cathode and anode of said valve, said valve having the characteristics that the capacitance between said control grid and said cathode varies with the current from said cathode, resonant circuit means having negligible impedance at said predetermined frequency connected to said cathode and common to said input and output circuits, said resonant circuit means including series connected capacitance means and inductance means resonant at said predetermined frequency through which at least a portion of the current from said cathode flows, and circuit means coupled to said inductance means and to said control grid for applying a portion of the voltage across said inductance means to said control grid for neutralizing variations in said capacitance between said control grid and said cathode, said resonant circuit means having substantially no effect on the signal transmission gain between said input and output circuits at said predetermined frequency.

9. A signal translating stage for amplifying a modulated carrier wave of a predetermined frequency, including in combination, an electron discharge valve having at least an anode, a cathode and a control grid, input and output circuits respectively coupled to said control grid and said anode of said valve, resonant circuit means having negligible impedance at said predetermined frequency connected to said cathode and common to said input and output circuits, said resonant circuit means including series connected capacitance means and inductance means resonant at said predetermined frequency through which at least a portion of the current from said cathode flows, and circuit means coupled to said inductance means and to said control grid for applying a portion of the voltage across said inductance means to said control grid for neutralizing variations in the capacitance between said control grid and said cathode, said resonant circuit means having substantially no effect on the signal transmission gain between said input and output circuits at said predetermined frequency.

JOHN A. RANKIN.

REFERENCES CITED

The following references are of record in the file of this patent:

UNITED STATES PATENTS

| Number | Name | Date |
|---|---|---|
| 2,002,338 | Buschbeck | May 21, 1935 |
| 2,209,394 | Farrington | July 30, 1940 |
| 2,240,715 | Percival | May 6, 1941 |
| 2,299,481 | Johansson | Oct. 20, 1942 |